United States Patent
Marette

[15] 3,664,375
[45] May 23, 1972

[54] COUPLING MECHANISM

[72] Inventor: Ralph Thomas Marette, Orange Village, Ohio

[73] Assignee: The Hansen Manufacturing Company, Cleveland, Ohio

[22] Filed: Aug. 10, 1970

[21] Appl. No.: 62,566

[52] U.S. Cl.................137/614.04, 137/614.02, 137/614.06
[51] Int. Cl...........................................................F16l 37/28
[58] Field of Search..................137/614.02, 614.04, 614.06, 137/614.03, 614.05

[56] References Cited

UNITED STATES PATENTS

| | | | |
|---|---|---|---|
| 3,301,272 | 1/1967 | Pettyjohn | 137/614.06 |
| 3,283,780 | 11/1966 | Sutton | 137/614.04 |
| 3,473,569 | 10/1969 | Guertin | 137/614.06 |

*Primary Examiner*—Samuel B. Rothberg
*Assistant Examiner*—William H. Wright
*Attorney*—Yount and Tarolli

[57] ABSTRACT

An improved coupling mechanism includes an actuator assembly which is manually operable to connect and disconnect a coupling having valves which are biased closed by fluid pressure. The actuator assembly includes a lever which is pivotally mounted on one coupling member. A linkage connected to the actuator lever is engageable with the other coupling member. Once the linkage has been engaged with the other coupling member, the lever is pivoted to actuate the linkage and move the coupling members toward each other to a connected condition. Simultaneously therewith, the valves are operated to the open condition against the influence of the fluid pressure bias to thereby connect the conduits in fluid communication. A second linkage is connected with the actuator lever to operate a coupling retainer or latch assembly to a release condition to facilitate disconnection of the coupling.

12 Claims, 4 Drawing Figures

INVENTOR
RALPH T. MARETTE
BY Yount and Tarolli
ATTORNEYS

INVENTOR
RALPH T. MARETTE
BY Yount and Tarolli
ATTORNEYS

COUPLING MECHANISM

The present invention relates generally to a coupling mechanism and more particularly to a coupling mechanism having an actuator assembly which is actuatable to connect an associated coupling.

A known two-way shut-off coupling includes a plug and socket having internal valves which are automatically opened as the coupling is connected and closed as the coupling is disconnected. When the coupling is disconnected, fluid pressure in conduits connected to the plug and socket bias the valves to their closed positions. If a substantial fluid pressure is present in the conduits, the force required to manually connect the coupling and open the valves against the fluid pressure biasing force can be relatively large. For example, with a specific known coupling arrangement and conduit pressures of approximately 30 psig. the force required to connect the coupling approached 100 lbs. For a coupling which is to be manually connected and disconnected, this operating force may be unacceptable.

Accordingly, it is an object of this invention to provide a new and improved coupling mechanism having an actuator assembly which is easily operated manually to connect a pair of coupling members and to simultaneously therewith open a valve which is biased toward a closed position by fluid under pressure.

Another object of this invention is to provide a new and improved coupling mechanism as set forth in the next preceding paragraph wherein the coupling members are locked or latched in a connected condition by a retainer device and the actuator assembly is selectively operable to release the retainer device to enable the coupling members to be disconnected.

Another object of this invention is to provide a new and improved coupling mechanism for connecting a pair of fluid conduits and which includes a pair of coupling members having valves which are biased closed by fluid pressure in the conduits and wherein the coupling mechanism includes an actuator assembly for connecting the coupling members and opening the valves against the influence of the biasing forces.

Another object of this invention is to provide a new and improved actuator assembly for connecting a pair of coupling members against the influence of a biasing force wherein the actuator assembly includes an actuator lever which is pivotally mounted on one of the coupling members, a linkage arrangement connected to the actuator lever for engaging the other coupling member, and a handle connected to the actuator lever to enable it to be manually moved to in such a manner as to cause the linkage to move the coupling members toward each other against the influence of the biasing force to thereby connect the coupling members.

These and other objects and features of the invention will become more apparent upon a consideration of the following description taken in connection with the accompanying drawings wherein.

Figure 1:
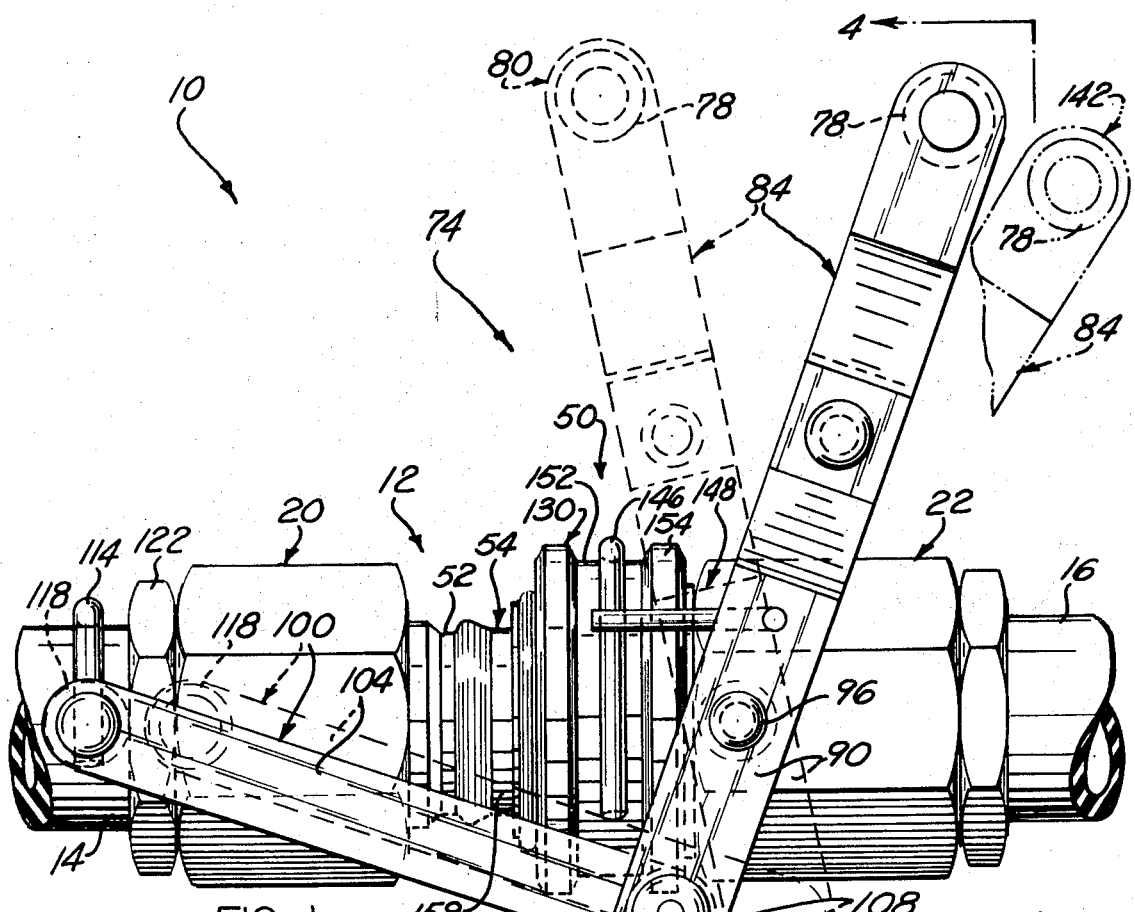
FIG. 1 is an elevational view of a coupling mechanism constructed in accordance with the present invention.

A coupling mechanism 10 constructed in accordance with the present invention includes a known coupling 12 for connecting a pair of conduits 14 and 16 in fluid communication. The coupling 12 is of the two-way shut-off type and includes a plug 20 which is received in a socket 22 to interconnect the conduits 14 and 16. When the coupling 12 is disconnected, valves 26 and 28 (FIG. 2) in the plug 20 and socket 22 are biased closed under the combined influence of springs 30 and 32 and fluid contained under pressure in chambers 34 and 36.

Figure 2:
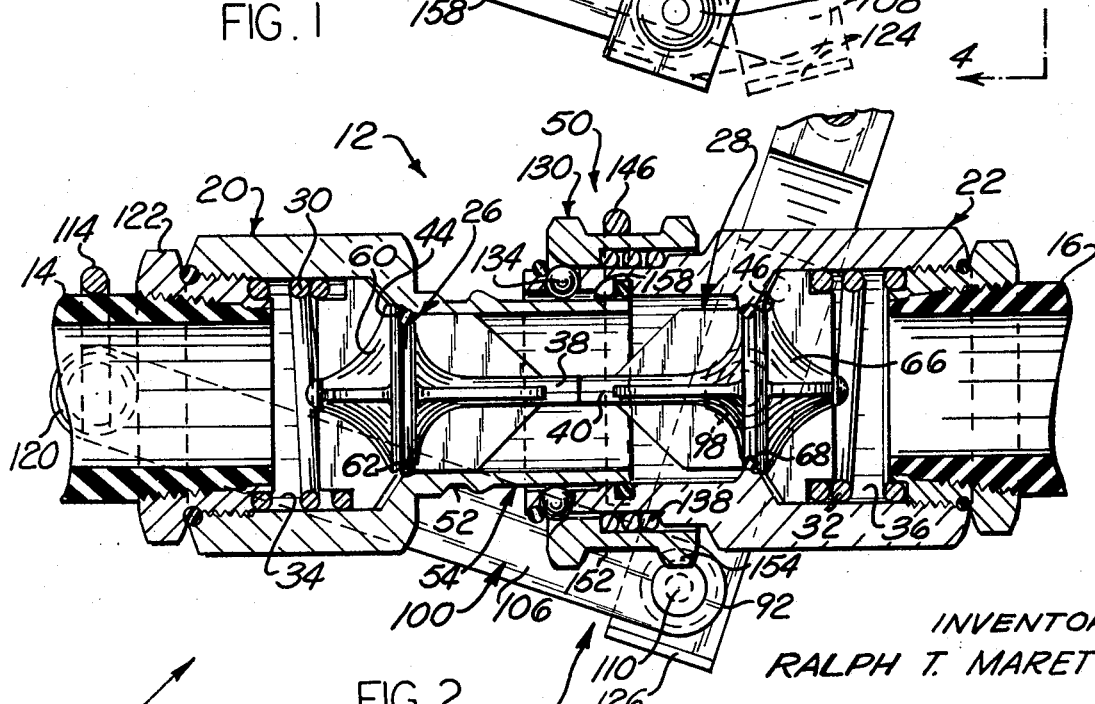
FIG. 2 is a partially broken away sectional view illustrating the relationship between a coupling and an actuator assembly of the coupling mechanism of FIG. 1, the coupling being shown in a disconnected condition.
Figure 3:
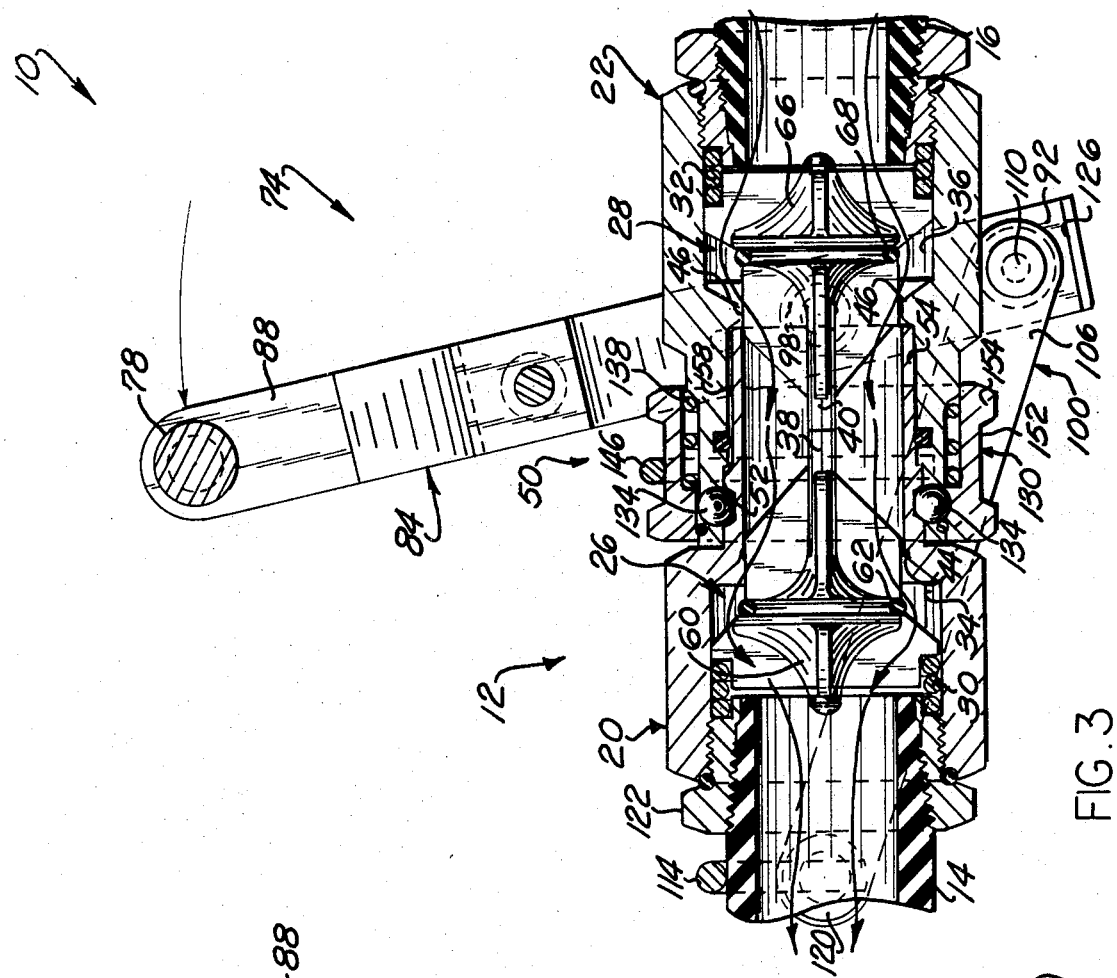
FIG. 3 is a sectional view, generally similar to FIG. 2, illustrating the relationship between the coupling and actuator assembly when the coupling is in a connected condition.

The coupling 12 is operated from the disconnected condition of FIGS. 1 and 2 to the connected condition of FIG. 3 by pushing the plug 20 into the socket 22. As the plug 20 enters the socket 22, outer end or nose portions 38 and 40 of the valves 26 and 28 are brought into abutting engagement. Continued movement of the plug 20 and socket 22 toward each other causes the valves 26 and 28 to move axially away from valve seats 44 and 46 to (FIG. 3) to enable fluid to flow between the conduits 14 and 16 through openings defined by the valve seats. When the coupling 12 is connected, a known latch or retainer assembly 50 on the socket 22 engages an annular recess 52 in a generally cylindrical leading end portion 54 of the plug 20 to lock or latch the coupling 12 in the connected condition. The retainer assembly 50 is subsequently operated to the released condition to enable the coupling 12 to be disconnected.

When the coupling 12 is disconnected (FIG. 2) fluid under pressure within the conduit 14 and chamber 34 applies pressure to an inner surface 60 of the valve 26 to press an annular valve ring 62 into sealing engagement with the valve seat 44. Similarily, fluid under pressure in the chamber 36 and conduit 16 applies a biasing force against an inner surface 66 of the valve 28 to press an annular valve ring 68 into sealing engagement with the valve seat 46. The combined biasing force exerted by the fluid under pressure and the valve springs 30 and 32 assures that the valves 26 and 28 will remain closed while the coupling 12 is disconnected.

When a substantial fluid pressure is present in the conduits 14 and 16, the biasing force urging the valves 26 and 28 toward their respective closed positions (FIG. 2) is relatively large. This relatively large biasing force is difficult to overcome when the coupling 12 is to be connected and the valves 26 and 28 opened. In addition, when substantial fluid pressure is present in the conduits 14 and 16 and the coupling 12 is being disconnected, the biasing force applied to the valves 26 and 28 could cause the coupling members 20 and 22 to kick apart or separate in a manner which could injure an operator who is disconnecting the coupling assembly.

In accordance with the present invention, the coupling mechanism 10 includes a manually operable actuator assembly 74 which provides a mechanical advantage to facilitate connecting the plug 20 and socket 22 while moving the valves 26 and 28 to their open positions against the influence of the biasing forces applied to the valves. In one specific embodiment of the invention, the combined fluid pressure and spring forces urging the valves 26 and 28 closed resulted in a biasing force of about 100 lbs. which had to be overcome to connect the coupling 12 and open the valves 26 and 28. In this one specific embodiment of the invention, the mechanical advantage provided by the actuator assembly 74 was such that the operator applied a force of approximately 25 to 30 lbs. against the handle 78 of the actuator assembly 74 to operate the actuator assembly and connect the coupling 12. Of course, the force required to operate any particular embodiment of the actuator assembly 74 will vary depending upon the mechanical advantage provided by the particular embodiment of the actuator assembly and the fluid pressure present in the conduits 14 and 16.

The actuator assembly 74 includes a lever 84 which is movable from an initial position (shown in solid lines in FIG. 1) to an actuated position (shown in dashed lines at 80 in FIG. 1) to effect operation of the coupling 12 from the disconnected condition of FIG. 2 to the connected condition of FIG. 3. The actuator lever 84 has a pair of upwardly extending arms 86 and 88 (FIG. 4) to which the handle 78 is connected. The actuator lever 84 also has a pair of downwardly extending legs 90 and 92 which are pivotally connected to the socket 22 by a pair of pivot mountings 96 and 98 (see FIGS. 2 and 4). The pivot mountings 96 and 98 support the actuator lever 84 for pivotal movement between the initial and actuated positions.

A linkage 100 is operable to push the plug 20 into the socket 22 upon movement of the actuator lever 84 from the initial position (FIG. 2) to the actuated position (FIG. 3). The linkage 100 includes a pair of parallel links or arms 104 and 106 which are pivotally connected at 108 and 110 to the legs 90 and 92 (see FIG. 4) of the actuator lever 84. The links 104 and 106 are interconnected at their outer end portions by a positioning collar 114 which rests on the conduit 14 to position the linkage 100 with cylindrical drive pins 118 and 120 in abutting engagement with an end fitting 122 of the plug 20 (see FIGS. 1-4). It should be noted that the linkage 100 can be disengaged from the plug 20 by merely swinging the links 104 and 106 upwardly as viewed in FIG. 1. This enables the socket 22 to be separated from the plug 20 when the coupling 12 is in the disconnected condition.

Figure 4:
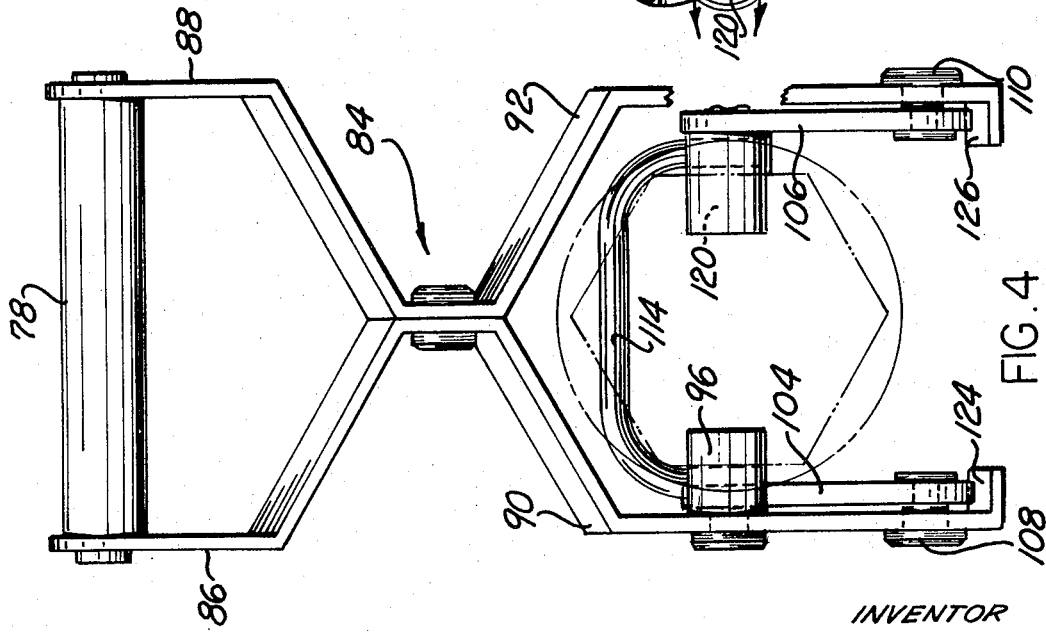
FIG. 4 is an elevational view taken generally along the line 4—4 of FIG. 1, further illustrating the construction of the actuator assembly.

Positioning the collar 114 in engagement with the conduit 14 is facilitated by a pair of stop flanges 124 and 126 (FIG. 4). The flanges 124 and 126 engage the links 104 and 106 to support them in an outwardly and upwardly extending position as the socket 22 is moved from a position separated from the plug 20 into engagement with the plug. Once the collar 114 has been positioned on the hose 14, the socket 22 can be readily moved into axial alignment with the plug 20. The linkage 100 is then retracted from the position shown in solid lines in FIGS. 1 and 2 to the position shown in FIG. 3 to thereby cause the drive members 118 and 120 to push the plug 20 into the socket 22.

As the plug 20 moves into the socket 22, the end portions 38 and 40 of the valves 26 and 28 are brought into abutting engagement (FIG. 2). Continued movement of the plug 20 into the socket 22 presses the valves 26 and 28 to the open condition of FIG. 3 against the influence of the fluid pressure in the conduits 14 and 16 and valve spring 30 and 32. Since the distance between the actuator lever pivot connections 96 and 98 and the handle 78 is greater than the distance between the pivot connections 96 and 98 and the connections 108 and 110 to the linkage 100, the actuator lever 74 provides a mechanical advantage which facilitates connecting the coupling 12 and simultaneously therewith opening the valves 26 and 28 against the biasing force applied to the valves. The plug 20 and socket 22 are then held in the connected condition by the retainer assembly 50.

The retainer assembly 50 is of a well known construction and includes a sleeve 130 which is slidable axially along the socket 22 between a released condition shown in FIG. 2 and a locking or latched condition shown in FIG. 3. When the retainer assembly 50 is in the locking or latched condition of FIG. 3, detent or locking balls 134 are pressed into the annular recess 52 in the plug 20 to hold the plug and socket 22 against axial movement relative to each other under the influence of biasing forces applied to the valves 26 and 28. The sleeve 130 is urged to the locking or latched position by a spring 138.

When the coupling 12 is to be disconnected, the sleeve 130 is retracted from the locking position (FIG. 3) to the release position (FIG. 2) so that the balls 134 can be cammed outwardly by the sloping surface of the recess 52. When this occurs the biasing force applied to the valves 26 and 28 by the springs 30 and 32 and the fluid pressure in the conduits 14 and 16 results in the plug 20 and socket 22 being moved axially away from each other to disconnect the coupling 12. The forces urging the plug 20 and socket 22 apart are relatively large when the valves 26 and 28 are in the open condition and a substantial fluid pressure is present in the conduits 16 and 18. This relatively large force could result in a kicking apart or rapid separation of the plug 20 and socket 22 in such a manner as to cause injury to a person who is disconnecting the coupling 12. However, the collar 114 retains the drive members 118 and 120 in position relative to the plug 20. Therefore, the handle 78 actuator lever 84 can be gripped to retain the plug 20 and socket 22 against excessive axial movement relative to each other as the valves 26 and 28 are closed and the coupling 12 disconnected.

Once the valves 26 and 28 have closed and the coupling 12 disconnected, the actuator assembly 74 can be disengaged from the plug 20 to enable the plug and socket to be separated. To accomplish this, the linkage 100 is pivoted in a clockwise direction (as viewed in FIGS. 1 and 2) about the pivot connections 108 and 110 to move the collar 114 and drive members 118 and 120 away from the plug 20. The plug 20 and socket 22 can then be moved axially apart. Once the plug 20 and socket 22 have been separated, the socket 22 and conduit 16 can be conveniently carried by the handle 78 of the actuator assembly 74.

In order to reconnect the coupling 12, the retainer assembly 50 must be operated to the released condition by retracting the sleeve 130 against the influence of the spring 138. The sleeve 130 is retracted by pivoting the actuator lever 84 in a clockwise direction to the position indicated in dashed lines at 142 in FIG. 1. This pivoting movement of the actuator lever 84 causes a sleeve actuator collar 146 of a linkage 148 to slide along a cylindrical surface 152 and into engagement with an annular shoulder 154 on the sleeve 130. Continued rearward movement of the actuator lever 84 and collar 146 pulls the sleeve 130 rearwardly to the released position shown in FIG. 1. When this has occurred, the detent balls 134 are free to move outwardly as the plug 20 is pushed into the socket 22. Once the detent balls 134 have engaged a cylindrical outer surface 158 of the plug 20 (see FIG. 2), the balls are held outwardly by the surface 158 for a sufficient distance to engage the sleeve 130 and prevent it from being operated to the locking position under the influence of the spring 138 until the detent balls are received in the recess 52.

When the coupling 12 is to be disconnected, the retainer assembly 50 is released by pivoting the actuating lever 84 in a clockwise direction (as viewed in FIG. 1) so that the collar 146 again moves into engagement with the annular shoulder 154. Continued rearward movement of the actuator lever 84 results in the collar 146 retracting the sleeve 130 against the influence of the spring 138. The coupling 12 is then disconnected and the valves 26 and 28 close under the influence of the biasing forces applied to the valves. It should be noted that the collar 146 is slidable along the sleeve surface 152 so that the lever 84 can move relative to the sleeve 130 to connect the coupling 12.

From the foregoing description it is apparent that the coupling mechanism 10 includes an actuator assembly 74 which is selectively operable to move the coupling 12 from the disconnected condition of FIG. 2 to the connected condition of FIG. 3. As the coupling 12 is connected, the valves 26 and 28 in the plug 20 and socket 22 are opened against the influence of biasing forces applied to the valves by fluid pressure and by the valve springs 30 and 32. When the coupling 12 is to be disconnected, the actuator assembly 74 is operated to release the retainer assembly 50 so that the valves 26 and 28 can move to the closed condition under the influence of the biasing forces applied to the valves.

The actuator assembly 74 includes an actuator lever 84 which is pivotally mounted on the socket 22. The linkage 100 is connected to the actuator lever 84 and pushes the plug 20 into the socket 22 upon operation of the actuator lever. Although the actuator lever 84 has been illustrated herein as being mounted on the socket 22, it should be understood that the actuator lever 84, if desired, could be mounted on the plug 20 and the linkage 100 utilized to pull the socket 22 toward the plug 20 upon operation of the actuator assembly 74. Whether the actuator assembly is mounted on the plug 20 or socket 22, it could be made removable therefrom. It should also be understood that although a particular known type of coupling 12 has been shown in association with the actuator assembly 74, it is contemplated that other known types of coupling assemblies could be utilized.

Having described a specific preferred embodiment of the invention, I claim:

1. A releasable coupling mechanism for connecting a conduit containing fluid under pressure in fluid communication with another conduit, said releasable coupling mechanism comprising a pair of coupling members each of which is connected with one of the conduits, said coupling members being movable between a disconnected condition in which said coupling members are disengaged and a connected condition in which said coupling members are engaged to connect the conduits in fluid communication with each other, valve means operatively connected with the one of said coupling members which is connected with the conduit containing fluid under pressure when said coupling members are in the disconnected condition, said valve means including a valve member which is urged to a closed position under the influence of the fluid under pressure in the conduit when said coupling members are in the disconnected condition, actuator means for operating said coupling members from the disconnected condition to the connected condition and for simultaneously therewith effecting operation of said valve member from the closed position to an open position against the influence of the fluid under pressure to thereby connect the conduits in fluid communication with each other, and releasable retainer means operable between a locking condition in which said retainer means holds said coupling members against operation from the connected condition to the disconnected condition and a release condition in which said retainer means is ineffective to hold said coupling members against operation to the disconnected condition, said actuator means being selectively operable when said coupling members are in the connected condition to effect operation of said retainer means from the locking condition to the release condition to thereby enable said coupling members to be operated to the disconnected condition, said retainer means including a sleeve slidably mounted on one of said coupling members and spring means for urging said sleeve toward a first position, said sleeve being axially movable relative to said one coupling member and against the influence of said spring means from a first position to a second position to thereby enable said retainer means to operate from the locking condition to the release condition, said actuator means including a manually operable actuator member operatively connected with said sleeve and said one coupling member, said actuator member being movable relative to said one coupling member to move said sleeve from said first position to said second position against the influence of said spring means, said actuator member being movable relative to said sleeve to effect operation of said coupling members to the connected condition.

2. A releasable coupling mechanism for connecting a conduit containing fluid under pressure in fluid communication with another conduit, said releasable coupling mechanism comprising a pair of coupling members each of which is connected with one of the conduits, said coupling members being movable between a disconnected condition in which said coupling members are disengaged and a connected condition in which said coupling members are engaged to connect the conduits in fluid communication with each other, valve means operatively connected with the one of said coupling members which is connected with the conduit containing fluid under pressure when said coupling members are in the disconnected condition, said valve means including a valve member which is urged to a closed position under the influence of the fluid under pressure in the conduit when said coupling members are in the disconnected condition, actuator means for operating said coupling members from the disconnected condition to the connected condition and for simultaneously therewith effecting operation of said valve member from the closed position to an open position against the influence of the fluid under pressure to thereby connect the conduits in fluid communication with each other, and releasable retainer means operable between a locking condition in which said retainer means holds said coupling members against operation from the connected condition to the disconnected condition and a release condition in which said retainer means is ineffective to hold said coupling members against operation to the disconnected condition, said actuator means being selectively operable when said coupling members are in the connected condition to effect operation of said retainer means from the locking condition to the release condition to thereby enable said coupling members to be operated to the disconnected condition, said actuator means including an actuator lever which is operatively connected with at least one of said coupling members and with said retainer means, said actuator lever being pivotal in a first direction about an axis to effect operation of said retainer means to the release condition, said actuator lever being pivotal in a second direction about the axis to effect operation of said coupling members to the connected condition.

3. A releasable coupling mechanism as set forth in claim 2 wherein said actuator means includes mounting means for connecting said actuator means to said one coupling member for movement therewith relative to the other coupling member when said coupling members are in the disconnected condition, said actuator means being operable between a disengaged condition in which said actuator means is spaced from said other coupling member and an engaged condition in which said actuator means engages said other coupling member and in which said actuator means is operable to effect operation of said coupling members from the disconnected condition to the connected condition.

4. A releasable coupling mechanism as set forth in claim 1 further including first valve means associated with a first one of said coupling members and operable between a closed condition blocking fluid flow from one of the conduits and an open condition in which fluid can flow from said one conduit, said first valve means including a first valve seat and a first valve member which cooperates with said first valve seat to block fluid flow from said one conduit when said first valve means is in the closed condition, said first valve member having an inner surface against which fluid under pressure in said one conduit applies a biasing force urging said first valve member toward said first valve seat, said first valve member being movable in a direction away from said first valve seat against the influence of the biasing force to effect operation of said first valve means from the closed condition to the open condition, second valve means associated with a second one of said coupling members and operable between a closed condition blocking fluid flow from the other conduit of the pair of conduits and an open condition in which fluid can flow from the other conduit, and second valve means including a second valve seat and a second valve member which cooperates with said second valve.

5. A coupling mechanism as set forth in claim 4 wherein said first valve member is disposed within said first coupling member and has an outer surface disposed in a generally coaxial relationship with said inner surface of said first valve member, said second valve member being disposed within said second coupling member and having an outer surface disposed in a generally coaxial relationship with said inner surface of said surface of said second valve member, said actuator means being operable while moving said first and second coupling members toward the connected condition to move said outer surfaces of first and second valve members into abutting engagement and to thereafter continue the movement of said first and second coupling members toward the connected condition to thereby effect the aforesaid relative movement between said first and second valve members and said first and second valve seats against the influence of the biasing forces applied to said first and second valve members.

6. A releasable coupling mechanism for connecting a conduit containing fluid under pressure in fluid communication with another conduit, said releasable coupling mechanism comprising a pair of coupling members each of which is connected with one of the conduits, said coupling members being movable between a disconnected condition in which said coupling members are disengaged and a condition in which said coupling members are engaged to connect the conduits in fluid communication with each other, at least one of said coupling members including releasable locking means operable between a release condition in which said coupling members are movable between the connected and disconnected conditions and a locking condition in which said locking means retains said coupling members in the connected condition, valve means operatively connected with the one of said coupling members which is connected with the conduit containing fluid under pressure when said coupling members are in the disconnected condition, said valve means including a valve member which is urged to a closed position under the influence of the fluid under pressure in the conduit when said coupling members are in the disconnected condition, and actuator means engagable with said first and second coupling member when they are in the disconnected condition for effecting relative movement between said coupling members to move said coupling members from the disconnected condition to the connected condition under the influence of said actuator means and for simultaneously therewith effecting operation of said valve member from the closed position to an open position against the influence of the fluid under pressure to thereby connect the conduits in fluid communication with each other, said actuator means including means for operating said locking means from the locking condition to the release condition when said coupling members are in the connected condition to release said coupling members for movement to the disconnected condition.

7. A releasable coupling mechanism as set forth in claim 6 wherein said actuator means includes means for limiting relative movement between said coupling members upon operation of said locking means to the release condition with said coupling members in the connected condition.

8. A releasable coupling mechanism as set forth in claim 6 wherein said means for operating said locking means is operable to operate said locking means to the release condition when said coupling members are in the disconnected condition.

9. A releasable coupling mechanism for connecting a conduit containing fluid under pressure in fluid communication with another conduit, said releasable coupling mechanism comprising a pair of coupling members each of which is connected with one of the conduits, said coupling members being movable between a disconnected condition in which said coupling members are disengaged and a connected condition in which said coupling members are engaged to connect the conduits in fluid communication with each other, valve means operatively connected with the one of said coupling members which is connected with the conduit containing fluid under pressure when said coupling members are in the disconnected condition, said valve means including a valve member which is urged to a closed position under the influence of fluid under pressure in the conduit when said coupling members are in the disconnected condition, actuator means for operating said coupling members from the disconnected condition to the connected connected condition and for simultaneously therewith effecting operation of said valve member from the closed position to an open position against the influence of the fluid under pressure to thereby connect the conduits in fluid communication with each other, said actuator means including operator means connected with a first one of said coupling members for engaging the other of said coupling members and for pulling said coupling members together toward the connected condition upon operation of said actuator means, and means for holding said operator means in a position extending forwardly of said first one of said coupling members during relative movement between said coupling members toward each other from spaced apart positions to facilitate engaging said other coupling member with said operator means.

10. A releasable coupling mechanism as set forth in claim 9 wherein said operator means includes arm means rotatably connected at an inner end portion with said first one of said coupling members and means for engaging said other coupling member connected with an outer end portion of said arm means for rotation therewith relative to said first one of said coupling members, said means for holding said operator means in a forwardly extending position including means for engaging said arm means and holding said arm means against rotation relative to said first one of said coupling members.

11. An actuator assembly for moving a pair of coupling members from a disconnected condition to a connected condition against the influence of a biasing force, said actuator assembly including an actuator lever having a pair of spaced apart legs extending parallel to each other, first mounting means extending inwardly from one of said legs for pivotally connecting said one leg to one side of one of said coupling members, second mounting means extending inwardly from the other of said legs for pivotally connecting said other leg to a side of said one coupling which is opposite from said one side to a first link pivotally connected at one end portion, to said one leg of said actuator lever, a second link pivotally connected at one end portion to said other leg of said actuator lever, a first stop member mounted on an end portion of first link which is remote from said actuator lever, a second stop member mounted on an end portion of said second link which is remote from said actuator lever, positioning means extending between said first and second links for locating said stop members in a predetermined relationship with the other coupling member, and handle means connected to said actuator lever for effecting movement of the coupling members to the connected condition, said handle means being manually movable to effect pivoting movement of said actuator lever about said first and second mounting means to effect linear movement of said first and second stop members and the other coupling member toward the one coupling member against the influence of the biasing force.

12. An actuator assembly as set forth in claim 11 further including linkage means for operatively connecting said actuator lever with a retainer assembly on the one coupling member, said linkage means being operable in response to pivotal movement of said actuator lever about said first and second mounting means to effect operation of the retainer assembly from latching condition to a release condition.

* * * * *